April 23, 1935.  P. A. KINZIE  1,998,459
NEEDLE VALVE
Filed Dec. 28, 1932  2 Sheets-Sheet 1
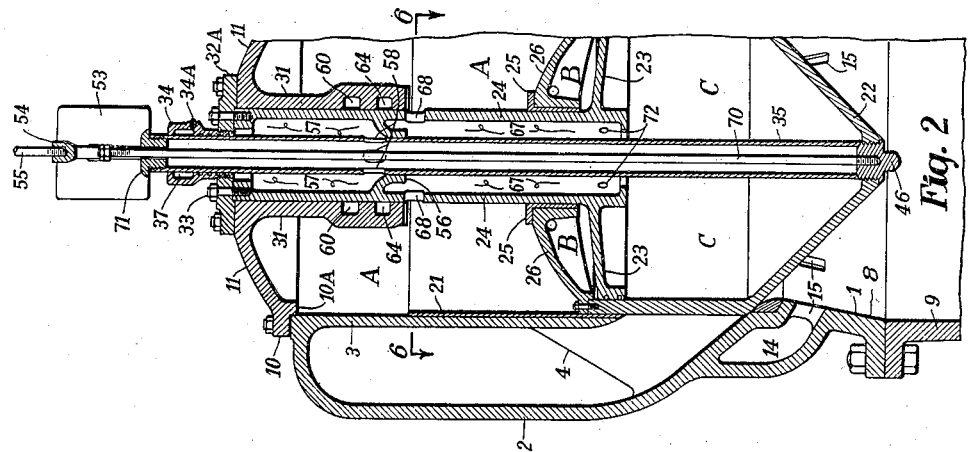
Inventor:
Phillip A. Kinzie,
By Byrnes Townsend & Potter,
Attorneys.

April 23, 1935.　　P. A. KINZIE　　1,998,459
NEEDLE VALVE
Filed Dec. 28, 1932　　2 Sheets-Sheet 2
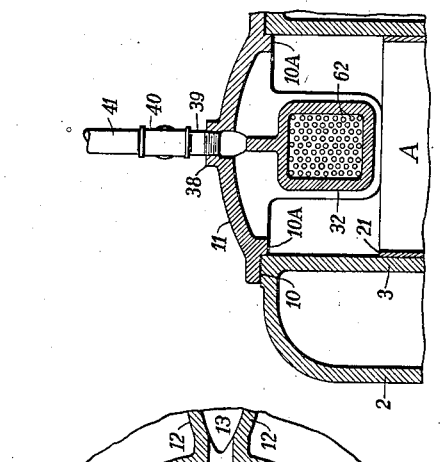
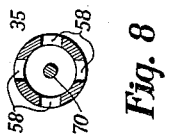
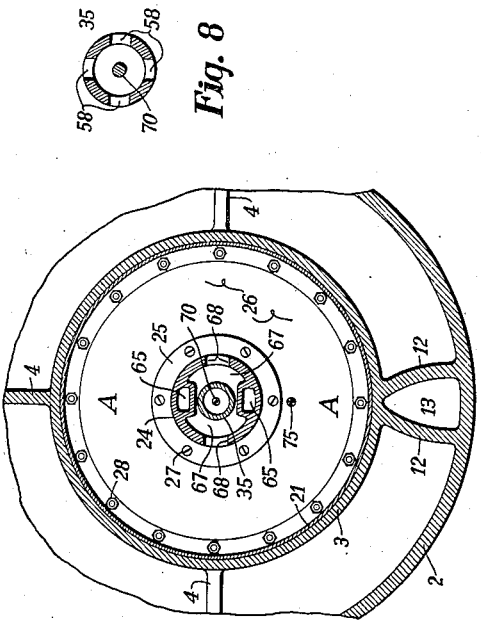
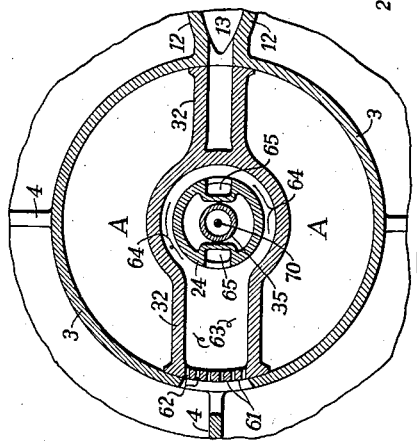
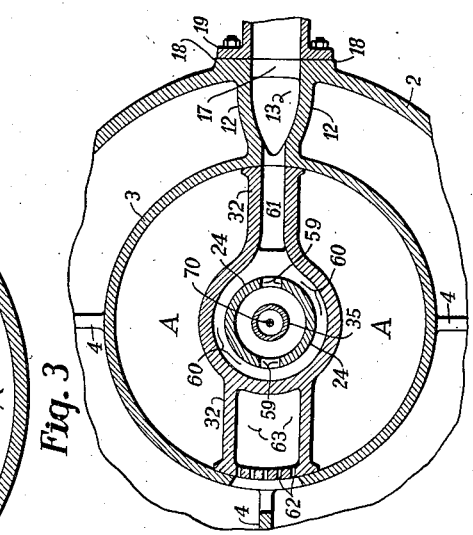
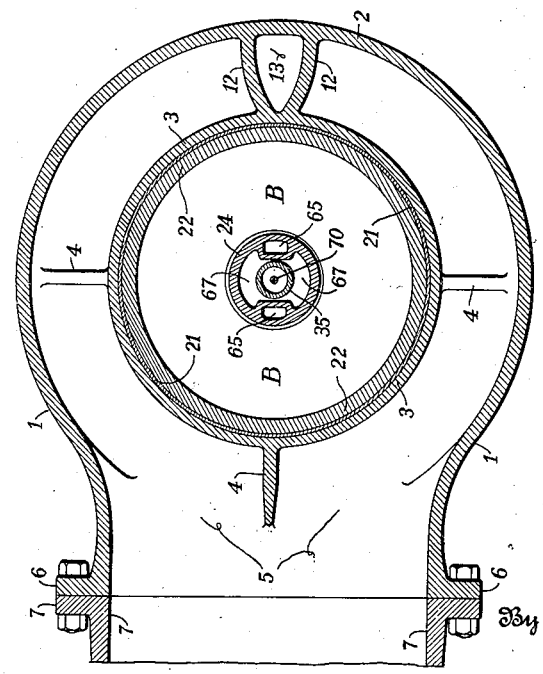

Patented Apr. 23, 1935

1,998,459

UNITED STATES PATENT OFFICE 1,998,459

NEEDLE VALVE

Phillip A. Kinzie, Denver, Colo., assignor to Universal Hydraulic Corporation, Denver, Colo., a corporation of Colorado Application December 28, 1932, Serial No. 649,223

21 Claims. (Cl. 137—139)

This invention relates to needle valves, and more particularly to a valve that is well adapted for the control of a drum or ring gate valve in response to small changes in the position of a control element which is actuated by changes in the water level at the drum or ring gate.

The invention will be described with reference to this use of the valve, but it will be apparent that the invention is not limited thereto since, for other fields of use, the control element of the valve may be automatically adjusted by variations in some factor other than water level, or it may be adjusted manually.

Where large volumes of water are released from reservoirs or forebays, and conditions are such as to make it desirable or essential to control the fluid level to close limits automatically over long periods of operation, some form of floatable overflow weir crests such as drum gates or ring gates are usually employed to accomplish this result by lowering these flow controlling crests and so increasing the outflow from the reservoir in equal measure to an increasing inflow therein, and conversely by raising the flow controlling crests and so reducing the outflow in equal measure to a diminishing inflow.

In service such as this, the large storage capacity of the fluid reservoirs with which such apparatus is usually associated, causes the fluctuating cycles of the fluid level to be very slow, and in consequence of this fact, the movements of the controlling media by which compensating corrections are made in the level of the buoyant weirs are, necessarily, likewise equally slow, so that in some instances the movement of their parts is so gradual as to be imperceptible to the observer. This condition necessitates equipment of a high order of sensitivity to insure that it will respond to these minute variations as they occur and, by close regulation of the fluid released from the flotation chambers of the buoyant weirs, shift the position of their overflow crests in correct response to these slowly varying conditions in such manner as to maintain the fluid level constant.

An object of the invention is to provide a needle valve of improved construction which will respond positively and accurately to small changes in the adjustment of the control element of the valve. An object is to provide a needle valve in which two pressure chambers are formed within the needle, and in which all passages and ports for supplying pressure fluid to and exhausting the same from the pressure chambers are formed within the valve casing. An object is to provide a needle valve of the type including a plurality of chambers for receiving pressure fluid, and which includes simplified vent and drain passages and ports for venting air from the chambers and for draining, when occasion requires, pressure fluid from all chambers. A further object is to provide a valve of the type in which the needle has a head slidable upon a diaphragm tube which supports a diaphragm within the needle, thereby to provide two pressure chambers within the needle, and which includes permanently open vents for discharging air from both chambers into a cavity within the valve which is continuously vented to atmosphere.

Another object is to provide a valve of the type in which a needle slides within an interior valve casing or cylinder, and which includes a bridge member extending across the cylinder, the bridge member contributing to the support of a diaphragm tube which extends into the needle and having pressure inlet and exhaust passages communicating with corresponding passages in the diaphragm tube. Other objects of the invention are to provide, in a valve of the needle type, improved constructions of the diaphragm tube which extends into and supports a diaphragm within the needle, the tube constituting a portion of the pressure inlet and exhaust passages leading to pressure chambers within the needle.

These and other objects and advantages of the invention will be apparent from the following specification, when taken with the accompanying drawings, in which:

Fig. 1 is a vertical longitudinal section taken upon the center line of a valve embodying the invention, the needle being shown in the open position;

Fig. 2 is a vertical transverse section taken upon the line 2—2 of Fig. 1, but showing the needle in the closed position;

Fig. 3 is a horizontal section taken upon the line 3—3 of Fig. 1;

Fig. 4 is a horizontal section taken upon the line 4—4 of Fig. 1;

Fig. 5 is a horizontal section taken substantially upon the line 5—5 of Fig. 1;

Fig. 6 is a horizontal section taken upon the line 6—6 of Fig. 2;

Fig. 7 is a vertical section taken upon the line 7—7 of Fig. 1; and

Fig. 8 is a horizontal section through tube 35 of Fig. 1, taken just below the under side of cap 32A.

In the several figures, in which like parts are indicated by like numerals throughout, the reference numeral 1 designates the valve body, comprising an outer casing 2 concentrically disposed about the inner cylinder 3 and connected thereto by radial ribs 4, the casing 2 having a main conduit inlet 5 whose outer portion terminates in a circular vertical flange face 6 adapted to boltingly receive the mating flanged face of the horizontally disposed conduit 7 supplying fluid to the valve, and whose lower concentric portion first downwardly contracts and then expands throughout the height of the discharge throat to merge into and form the downwardly facing discharge flange 8, which boltingly receives the similarly flanged discharge conduit 9 below. The inner casing 3 merges into the upper confines of the inwardly sweeping outer casing 2 which defines the upper limits of the valve body 1, as may be seen in Fig. 2, where it will be apparent that this inwardly sweeping upper portion of 2, in merging with the upper portion of 3, forms on its upper surface a flange face which matingly receives the bolted flange 10 of domed cover 11.

Outer shell 2 and inner shell 3 are also connected one to the other throughout the major portion of the valve's height by two vertical members 12, Figs. 3, 4, 5 and 6, which are symmetrically curved in plan to form the side walls of a spade-shaped vertical passage 13, Fig. 1, affording communication between the interior of the inner shell 3 at its upper terminal, and the annular cored passage 14 surrounding the expanding discharge throat at its lower terminal. The annular cored passage 14 is provided with radially cored ports 15 through the wall of the expanding discharge throat 8 beneath the valve seat 16.

Near the upper terminal of vertical passage 13 an outwardly extending port 17, Figs. 1 and 5, pierces the outer shell 2, and is provided with a circular flange face 18 which boltingly receives the elbow 19 of air pipe 20 which extends upwards to the atmosphere at a level higher than that of the fluid surface controlled or, if desired, the flange of an automatic air valve similar to that described in my copending application, Ser. No. 649,222, filed December 28, 1932, may be attached thereto.

The interior of the inner casing 3 is bored concentric with the vertical axis of the valve from the top down to its lower end, and a non-corrodible metal liner 21 is pressed tightly therein and bored in place, the bore in this liner being continued downward until it meets the inwardly contracting inner surfaces of the outer shell 2 above and adjacent to the discharge throat. The boring of liner 21 thus finishes the faces of the radial ribs 4 and the apexed merger of curved ribs 12 to form guides to maintain the reciprocatingly mounted needle 22 in correct vertical alignment with respect to seat 16 as it approaches the closed position, shown in Fig. 2. The seat 16 is a non-corrodible ring tightly pressed into a counterbore in the outer shell 2 and with its curving inwardly facing finished surfaces forming continuity with the adjacent portions of the valve body, as may be seen in Figs. 1 and 2.

Within the vertical bore of liner 21 and ribs 4, and 12, the needle 22 is reciprocatingly mounted, its upper cylindrical outer diameter being made a close sliding fit in this bore, while the curving merger of the lower portion of its cylindrical upper portion with the conical nose comprising its lower part, forms a cooperating seat surface to seatingly contact the oppositely curving female surfaces of seat ring 16 mounted in the body 1 below, whenever the needle reaches its lowest position as shown in Fig. 2.

The needle 22 is composed of non-corrodible metal and the interior of its cylindrical upper portion is bored from its upper end throughout its vertical length to a close sliding fit over the finished cylindrical periphery of diaphragm 23, which is also composed of non-corrodible metal and is formed integral with diaphragm tube 24, whose upwardly extending cylindrical shank length is finished to slidingly receive the closely fitted non-corrodible bushing 25 which is pressed into the domed needle head 26, and there retained in place by the countersunk screws 27.

The outer peripheral boundary of needle head 26 is provided with a flanged surface whose under side matingly engages the similar upper surface of needle 22 and is held in bolted engagement thereto by the studs 28. Needle head 26 is maintained concentric with the needle 22 by shoulder 29, on the under side of its flanged face, which is turned to an accurate fit in the bore of the needle.

The upper end of the bored interior of inner shell 3 is closed off by the domed head 11, whose flange 10 is held in bolted engagement with the top face of valve body 1 by the studs 30 and is concentrically positioned with respect to this bore and the vertical axis of the valve by a downward facing shoulder 10A, on the lower side of flange 10, which has a turned diameter accurately fitted to this bore. Domed head 11 is provided with a central, downwardly extending hub 31 whose lower portion merges into a hollow bridge member 32, Figs. 1, 4 and 5, extending horizontally across the bore in inner shell 3. The opposite ends of this hollow bridge member are accurately turned to make a tight fit in this bore.

The interior of hub 31 and the corresponding central portion of bridge member 32 are bored vertically to receive the upper portion of diaphragm tube 24 which is made a tight fit therein, and whose upper end face protrudes slightly above the upper surface of 11 to enter a shallow counterbore in the under face of flanged cap 32A, which is centralized thereby with respect to 24 and 1. Cap 32A is bolted to the upper end face of tube 24 and also to the top face of domed head 11 by the studs 33, Fig. 1, and thereby maintains diaphragm 23 and diaphragm tube 24 immovable in the position as shown in the various figures.

It will be seen that the space within the inner shell 3 and the needle 22 is divided into three tandem chambers for receiving pressure fluid for actuating the needle; the chamber A being defined by the upper portion of shell 3, the domed head 11 and the needle head 26, while chambers B and C are formed within the needle 22 by the diaphragm 23. Pressure fluid in chambers A and C tends to move the needle to closed position, and pressure fluid in chamber B tends to move the valve to open position.

The cap 32A is tapped to threadably receive, concentric with the axis of the valve, the upwardly extending sealing member 34 which is bored to slidingly receive the control tube 35, and is provided with vertically spaced annular resistance grooves 36 in said bore to prevent fluid from the valve's interior from escaping upwards through the clearance provided between the bore in sealing member 34 and the outer surface of control tube 35. A plugged pipe tap 34A in the outer wall of the sealing member 34 communicates with the annular cavity within member 34 to receive a small drain pipe, not shown, if, when in service, excessive pressures occur and fluid should be found to be escaping from the top of member 34.

The drain pipe can be led off to any convenient point, such as vent pipe 20, and the waste fluid so disposed of therethrough. Under normal conditions, no drain pipe is required.

Domed head 11 is provided with a boss 38, Figs. 1 and 7, upon its upper face to threadably receive nipple 39 to whose upper end the T 40 is threadedly attached. A vertical air vent pipe 41 extends upwards from this T with its upper end open to the atmosphere at an elevation somewhat above the maximum level attained by that of the fluid body in the reservoir. If desired, an automatic air valve similar to that disclosed in my copending application, above mentioned, may be attached directly to the T 40 in lieu of pipe 41. To the horizontal leg of the T 40 a reservoir pressure supply pipe 42 is connected with a stop valve 43 inserted therein in such manner that by opening this valve reservoir pressure can be admitted into chamber A within the valve when putting same into service, as will be described later.

By reference to Fig. 1 it will be seen that the lower conical portion of needle 22 terminates in a tapped boss 44 provided with a shouldered face 45 against which a similar shoulder upon the matingly threaded plug 46 is engaged. The lower end of this plug terminates in a round-nosed conical surface formed in continuity with the similar outer conical surface of the needle 22. The upwardly extending threaded portion of plug 46 continues above the upper surface of boss 44 within the interior of the needle and terminates in an inwardly converging conical valve seat surface 47 whose upper limits are defined by the upper end face of the plug 46.

This seat surface 47 is cooperatingly engaged by the similar matingly formed conical seat 49 provided at the lower end of control tube 35, which, when in engagement with the seat 47, as shown in Fig. 2, forms a fluid-tight joint and thereby prevents fluid in chamber C from escaping upwards therefrom through the interior of tube 35. A small vertical drain hole 48 in plug 46 is in effective communication with chamber C only when the tube 35 is raised from contact with the seat 47.

Control tube 35 is positioned concentric with the vertical axis of the valve and extends upwards, passing through the sealing member 34 on top of the valve and terminating some distance above with its upper end tapped to receive the similarly threaded lower end 50 of lifting yoke 51, whose symmetrically disposed arms 52 support the weights 53. The upper portion of yoke 51 terminates in a tapped boss 54 which threadably receives the lower end extension 55 of a turnbuckle or other suitable device connected by cable or other means, not shown, to an appropriate float mechanism employed to actuate the valve, such for example, as is illustrated in the patent to Kinzie and Savage, No. 1,878,150, granted September 20, 1932. Such float mechanisms are well understood by those skilled in the art, and will therefore not be described or illustrated in this application; it being understood that such a device is employed, and that by suitable mechanism incorporated in it fluid level variations at the reservoir are thereby magnified and then impressed upon the yoke 51 and tube 35 as equivalent motions of enlarged scope in an upward direction when the controlled fluid level rises, and in a downward direction as the controlled fluid falls, and so causing the needle 22 to rise and fall in similar manner, thereby opening and closing the valve as will be presently described.

The exterior cylindrical surface of tube 35 is made an easy sliding fit within the bore of the member 34 on top of the valve, and also within that portion of the diaphragm tube 24, Figs. 1 and 2, where for a short vertical distance the bored boss 56 makes a practically fluid-tight joint around the tube to segregate the annular chamber 57 enclosed by the upper portion of diaphragm tube 24 from the similar chamber below the bored boss 56.

Turning again to Fig. 1, it will be seen that control tube 35 is provided with radial ports 58 (see also Fig. 8) through its walls immediately below the lower end of sealing member 34, and that these ports provide communication between the interior of the tube 35 and the annular chamber 57, Figs. 1, 2 and 5, which here surrounds it, and in consequence of this fact fluid passing upwards from chamber C through 35 will escape through ports 58 into annular chamber 57, from which it is discharged through the two ports 59 in the walls of diaphragm tube 24, into the annular ring port 60, Figs. 1 and 5, in the hub portion of the bridge member 32. Ring ports 60 open into passage 61 which extends towards the right through the bridge member 32 to register with the upper end of vertical passage 13, through which the pressure fluid from chamber C passes downward into annular passage 14 and is discharged therefrom through the radial ports 15 into the throat below valve seat 16.

By the arrangement and construction of the control tube 35 and its associated parts as just described, it functions smoothly and easily with a minimum of friction in controlling the movements of the needle, and, in consequence of that fact, the valve is made more sensitive and responsive to minute fluctuations of fluid level because the float-actuated mechanism need exert but a very small force to make the valve respond to its movements.

Pressure fluid is supplied to the actuating chambers within the valve from inlet conduit passage 5, Fig. 1, through the perforated end wall 62 of tubular bridge member 32, this wall being pierced by a large number of small holes to form a screen which prevents foreign material large enough to cause trouble from gaining access to the interior ports and passages. Pressure fluid, after passing the perforated wall 62 enters the cored passage 63, in bridge member 32, whose opposite end communicates with the annular ring port 64, Figs. 1 and 4, to deliver the pressure fluid into the two vertical passages 65 cored in the diaphragm tube 24. The pressure fluid flows downwards through the two passages 65 and out of their lower ends 66, Fig. 1, immediately above and adjacent to the upper surface of diaphragm 23 and into chamber B. By this arrangement chamber B is subjected to reservoir pressure constantly so long as the valve is in service, and by leakage through the carefully predetermined clearance provided between the periphery of diaphragm 23 and the adjacent bore of needle 22, a limited quantity of pressure fluid is supplied to chamber C, which is in constant communication with chamber A above by the annular space 67, Figs. 1, 2, 3 and 6, between the control tube 35 and the portion of the interior walls of diaphragm tube 24 below the boss 56. The upper portion of space 67 communicates with the two ports 68, Figs. 2 and 6, which open through the walls of 24 directly into chamber A.

Valves employed in the service and for the purposes herein described are normally subjected to quite moderate working pressures produced by fluid heads which seldom if ever exceed fifty feet above the valve, and, in consequence of this fact, the attendant velocities of flow and fluid pressures which they are required to control are below the values where this principle of constant intercommunication between chambers A and C begins to become objectionable by making operation uncertain and difficult to accomplish, which condition has developed when this constant intercommunication has been employed under the higher heads.

By this arrangement chamber B, being under constant reservoir pressure, tends to open the valve by raising the needle 22, and will so do until such time as control tube 35 is seated upon plug 46, thereby stopping off escape of fluid from chambers A and C, whereupon the controlled leakage from B into these chambers builds up pressure therein, and since their combined areas are much greater than that of chamber B, the downward force which they now create is greater than the upward force produced in chamber B. When this occurs, the needle 22 will start to move downward, drawing seat 47 on needle tip plug 46 away from seat 49 on the bottom end of control tube 35, thereby progressively opening the interior of tube 35 to allow the escape of fluid from chambers A and C until such time that a balance of forces between chambers A and C and chamber B is established, whereupon further movement of the needle will cease until such time as the control tube 35 is again shifted.

From this it is evident that continued downward movement of control tube 35 will be accompanied by an equivalent continued downward movement of the needle 22, and, conversely, that continued upward movement of control tube will be accompanied by equivalent upward movement of the needle. As noted above, the turnbuckle 55 is connected to appropriate float controlled mechanism when the needle valve forms part of a system for automatically maintaining a substantially constant water level in a reservoir. The hydraulic chambers by which the flow controlling weirs are supported communicate with the inlet pipe 7 of the needle valve, and the height of the crests of the weirs is adjusted by regulating the flow of water through the needle valve. As the water level in the reservoir rises, the control tube 35 is automatically lifted by the float mechanism, and the resultant opening movement of the needle 22 permits the more rapid flow of water through pipe 7, thus reducing the volume of water in the hydraulic chambers which support the weirs.

Valves such as those herein described and illustrated are usually protected by a gate valve in the inlet conduit 7, permitting this conduit leading to the valve to be closed so that its interior may from time to time be inspected and cleaned. This arrangement also gives protection against freezing temperatures, for the gate valve can then be closed, the float connecting mechanism attached to the turnbuckle 55 above the valve blocked against movement, and then by screwing down nut 69, Fig. 1, on rod 70, which is attached to plug 46 in the nose of the needle, until nut 69 bears on the face 71 of the yoke 51, the needle 22 may be raised slightly off its seat 16 to allow any reasonable leakage past the gate valve into conduit 7 to drain away.

Drain hole 48, Fig. 1, in the plug 46 at the lower end of needle 22 allows chamber C to drain directly into the outlet conduit 9 below, likewise chamber A which is in direct communication with chamber C, while any fluid contained within chamber B will gradually leak past the diaphragm 23 through the leakage clearance there provided, into chamber C and likewise escape through 48. When the valve is in service and closed while under pressure, no leakage escapes through drain hole 48, because tube 35 has its seat 49 in engagement with seat 47 and hole 48 is inside of this seat and is then cut off from draining chamber C.

Valves such as those herein described usually operate at partial openings; i. e., the needle is seldom raised more than a fraction of its full opening travel, and, under such conditions, there is a marked tendency for negative pressures to be present in the discharge throat below the seat 16. Such a condition is detrimental to the adjacent metallic surfaces and reduces the useful life of the apparatus within which it occurs. These negative pressures likewise tend to produce serious surges in the fluid column below the valve, which sometimes develop to dangerous magnitudes. The formation of such negative pressures and surges is prevented by air coming down pipe 20, Fig. 1, through port 17 into vertical passage 13, into annular passage 14 and through the radial ports 15 into the zone where such negative pressures would otherwise develop. From this it will be seen that vertical passage 13 in the valve body is very important for proper functioning of the valve as it serves a dual purpose; namely, it affords a self-contained drain for disposal of waste fluid coming from the control system, and it also serves to supply air to the discharge throat in the lower portion of the valve and thereby prevents the progressive development of negative pressures in that zone as well.

In order that valves such as those illustrated herein may successfully function, it is essential that the actuating chambers and their intercommunicating ports and passageways subjected to fluid pressure be freed from trapped air. This is accomplished automatically in the valve illustrated in the following manner. Air within chamber C, beneath diaphragm 23, Fig. 1, escapes through the two cored ports 72 into vertical passage 67 and from thence into chamber A through the ports 68, Fig. 2. Air within chamber B is collected beneath the under side of the domed needle head 26, passed through the cored ports 73 through the radial ribs 74, around the outer circumference of the hub containing bushing 25 to the plug 75, tapped into needle head 26. This plug has a small drilled hole 76 through its center and constitutes a calibrated orifice for venting air into chamber A, but which will not permit the escape of any substantial quantity of pressure fluid when there is no air to be vented. Chamber A is open to the atmosphere at all times through pipe 41 which, as before explained, rises to an elevation higher than that of the liquid surface being controlled, and is there opened to the air. By this arrangement all the interior cavities of the valve are vented automatically at all times, but the desired relative fluid pressures are maintained in the several chambers.

When putting the valve into service, it will be evident from the previous description and from inspection of Fig. 1, that were the gate valve (not shown) in conduit 7 controlling the inlet 5 to the valve to be opened, pressure fluid would first be admitted to chamber B, causing the valve to immediately open (there being as yet no fluid in chambers A and C), and if the hydraulic chamber to which the valve is controllingly attached were to be of limited cubical capacity, its contents would be drained out before sufficient fluid would leak into chambers A and C to make them effective in closing the valve. To prevent this condition from occurring, the plug valve 43 in pipe 42 leading from the reservoir is opened first to fill chambers A and C with pressure fluid, which will then hold the valve closed, after which valve 43 is closed again and the gate valve in supply conduit 7 is then opened. Perfect control of the valve is thus established immediately and the needle moves to the position determined by the setting of the control tube 35.

It will be apparent that the invention is not limited to the particular construction herein illustrated and described, or to the joint use of all of the novel structural features and relationships incorporated therein. With appropriate changes in the form of the valve body and the connections to the control tube 35, the needle valve may be arranged axially of the alined inlet and outlet ports of the valve. Or, for use under high pressure heads at which leakage between the cylindrical wall of the needle 22 and the liner 21 may give rise to uncertain operation when the chamber A is subjected to fluid pressure, the pressure fluid may be confined to chambers B and C by omitting the ports 68 which place chambers A and C in continuous communication. The space A may then be continuously vented to atmosphere and not subjected to any fluid pressure, as described and claimed in my co-pending application Ser. No. 544,880, filed June 16, 1931.

To those skilled in the art to which this invention relates it will be obvious that modifications may be made in the details of construction of the parts and their relative arrangement without departing from the spirit of my invention or the scope of the following claims.

I claim:

1. In a valve of the needle type, a casing having an inlet and an outlet, a shell within said casing and secured thereto by a plurality of radial ribs, a valve seat adjacent the said outlet, a needle slidable in said shell and cooperating with said seat to control fluid flow through said casing, means providing a plurality of chambers for receiving pressure fluid to actuate said needle, and means for supplying pressure fluid to and exhausting the same from the said chambers, said last means including an exhaust fluid passage extending along said casing and having side walls formed by an adjacent pair of said radial ribs.

2. In a needle valve, a casing having an inlet and an outlet, a shell within said casing, a plurality of radial ribs extending between said casing and shell, a needle slidable in said shell and cooperating with a seat on said casing, means cooperating with said needle to form a pair of chambers within the needle, an exhaust fluid passage formed between said casing and shell, said passage extending along said casing between an adjacent pair of said ribs and opening into said outlet beyond the valve seat, means for supplying pressure fluid to one of said chambers, and means for exhausting pressure fluid from the other chamber to said fluid passage.

3. In a needle valve, a casing having an inlet and an outlet, a shell within the casing, a plurality of ribs connecting said shell and casing, a needle slidable in said shell, means cooperating with said needle to form a plurality of pressure chambers, means for supplying pressure fluid to said chambers, and means for exhausting pressure fluid from one of said chambers, said exhausting means including an exhaust passage which opens into the outlet of said casing and is formed between said shell and casing by a pair of ribs.

4. A needle valve comprising a casing having a valve seat, a cylinder within and spaced from said casing to provide a fluid conduit therethrough, a needle slidable in said cylinder, a diaphragm tube supporting a diaphragm within said needle, a needle head slidable on said tube, passages within said tube communicating with the chambers formed within said needle at opposite sides of said diaphragm, and means for controlling the position of said needle by regulating the relative pressures of the fluid within the same; said means including a bridge member extending across said cylinder and having a hub surrounding said tube, pressure fluid supply and exhaust passages in said bridge member, and ports in said hub for establishing communication between the passages of said bridge member and said tube.

5. A needle valve as claimed in claim 4, wherein the pressure fluid supply passage of said bridge member opens into the fluid conduit of said valve casing.

6. A needle valve as claimed in claim 4, in combination with a pair of ribs between said casing and cylinder, the upstream ends of said ribs being joined to seal the fluid passage therebetween from the fluid conduit within said casing, said cylinder being provided with an opening affording communication between the said fluid passage and the exhaust passage of said bridge member, and an outlet opening for said fluid passage into the fluid conduit of said casing beyond the said valve seat.

7. In a needle valve, a casing, a cylinder within the casing, a needle within the cylinder and having a needle head, a diaphragm tube extending through said head and carrying a diaphragm which cooperates with said needle and head to form two tandem pressure chambers within said needle, a bridge member extending across said cylinder and having a hub closely fitting said tube, a pressure fluid inlet passage and an exhaust fluid passage in said bridge member, passages in said tube for communication with said chambers, ports in said hub to afford communication between the passages in said bridge member and said tube, and control means for regulating the flow of pressure fluid through at least one of said passages, thereby to control the position of said needle.

8. In a needle valve, a casing having inlet and outlet flanges disposed at right angles to each other, a cylinder merging into said casing and arranged axially of said outlet flange, said cylinder being spaced from said casing to provide a fluid conduit between the same, a valve seat adjacent said outlet flange, a needle slidable in said cylinder, a cover secured to said casing to close one end of said cylinder, means cooperating with said needle to form a plurality of pressure chambers, an exhaust fluid passage between said cylinder and casing, said exhaust fluid passage opening into said fluid conduit beyond said valve seat, means for introducing pressure fluid into one of said pressure chambers, and control means for regulating the escape of pressure fluid from another of said chambers to said exhaust conduit.

9. A needle valve as claimed in claim 8, in combination with means for introducing air into said exhaust fluid passage to prevent the establishment of a negative pressure below said valve seat, said means preventing the passage therethrough of fluid exhausted into said exhaust fluid passage.

10. A needle valve as claimed in claim 8, wherein said means cooperating with said needle comprises a diaphragm tube secured to said cover and supporting a diaphragm within said needle, and a head on said needle and slidable on said tube.

11. In a needle valve, a casing, a cylinder therein and spaced therefrom to provide a fluid conduit through said casing, a valve seat on said casing, a needle slidable in said cylinder, a diaphragm tube supporting a diaphragm within said needle, a head on said needle and slidable on said tube, a control tube having a close sliding fit within an interior boss on said diaphragm tube, means including passages in said diaphragm tube for supplying pressure fluid to both of the chambers formed within said needle at opposite sides of said diaphragm, exhaust passages, and cooperating valve means on said control tube and needle for regulating the exhaust of pressure fluid from one of said chambers.

12. A needle valve as claimed in claim 11 wherein a third pressure chamber is formed between said cylinder and said needle head, and the inner wall of said diaphragm tube is spaced from said control tube to provide a pair of annular passages at opposite sides of said boss, a port in said diaphragm tube affording continuous communication between said third chamber and the chamber at the nose of said needle through one of said annular passages, and said exhaust passages include said control tube and the second of said annular passages.

13. In a needle valve, a casing having inlet and outlet flanges, a cylinder merging into said casing and axially alined with said outlet flange, a needle slidable in said cylinder and cooperating with a valve seat in said casing adjacent said outlet flange, a cover closing one end of said cylinder and having a hub coaxial therewith, a diaphragm tube in said hub and supporting a diaphragm within said needle, a member extending from said hub and providing a pressure fluid inlet passage communicating with the conduit space between said casing and cylinder, an exhaust passage in said member, a control tube having a close sliding fit in a boss formed at an intermediate portion of said diaphragm tube, a pair of annular spaces being formed between said diaphragm tube and control tube at opposite sides of said boss, passages in said diaphragm tube for supplying fluid pressure to the chambers formed within said needle at opposite sides of said diaphragm, a port in said hub affording communication between said inlet fluid passage and the said passages in said diaphragm tube, a port in said hub providing communication between one of said annular spaces and the exhaust passage of said member, said control tube having a port opening into the said annular space, and cooperating valve means on said control tube and needle for regulating the flow of exhaust fluid through said control tube.

14. A needle valve as claimed in claim 13, wherein a third pressure chamber is formed by said cylinder and said needle head, and said diaphragm tube is provided with a port affording continuous free communication between said third pressure chamber and the chamber at the nose of said needle through the second of said annular spaces.

15. A needle valve as set forth in claim 13, wherein said member extends transversely of said cylinder, and the exhaust passage therein communicates with an exhaust fluid passage formed between said casing and cylinder by a pair of radial ribs.

16. In a needle valve, a casing having inlet and outlet openings in planes at right angles to each other, a cylinder axially alined with said outlet opening, one end of said cylinder being adjacent said outlet opening and the other end joining said casing, a cover closing said second end of said cylinder, a hub supported by said cover within and coaxial of said cylinder, means including said needle and a tube mounted in said hub to form a plurality of pressure chambers within said needle, said tube having passages therein communicating with the respective chambers, pressure inlet and exhaust passages communicating with the respective passages of said tube, and control means extending through said tube for regulating the exhaust of fluid from one of said pressure chambers.

17. The invention as set forth in claim 16, wherein said pressure inlet and exhaust passages communicating with the respective passages of said tube comprise, a hollow bridge member extending in opposite directions from said hub to the circumference of said cylinder, and ports in said hub affording communication between the passages provided by said hollow bridge member and the passages of said tube.

18. In a needle valve, a casing having a valve seat, a cylinder within said casing and axially alined with said valve seat, a needle movable in said cylinder, a closure for the end of said cylinder opposite said valve seat, a hub on said closure and supporting a bridge member transversely of said cylinder, a diaphragm tube supported in said hub, a diaphragm on said tube and within said needle, a needle head slidable on said tube, a set of inlet and exhaust passages in said bridge member, a set of inlet and exhaust passages in said tube opening into the pressure chambers formed within said needle at opposite sides of said diaphragm, ports in said hub affording communication between the passages of said sets, and control means within said casing to control the flow of a pressure medium in certain of said passages, said control means extending axially through said tube and hub to the exterior of said casing.

19. In a needle valve, a casing, a vertically arranged cylinder within and spaced from the same, a valve seat on said casing below and coaxial with said cylinder, a needle within said cylinder, means cooperating with said cylinder and needle to provide three tandem compartments, two of said compartments being pressure fluid chambers within said needle, means venting the third compartment to atmosphere, and means constituting continuously open vents for venting air from the chambers within said needle into the said third compartment.

20. A needle valve as claimed in claim 19, in combination with a control tube and a cooperating valve seat at the nose of said needle for regulating the exhaust of pressure fluid from the compartment at the nose of said needle, and a continuously open drain opening through the nose of said needle and arranged within the circumference of said control tube, whereby pressure fluid may escape through said drain opening only when said control tube is not engaged upon said cooperating valve seat.

21. In a needle valve, a casing, a needle slidable within said casing, means cooperating with said needle to form a plurality of chambers for receiving pressure fluid to actuate said needle, a control tube extending into said needle and slidable with respect to said casing and needle, valve means carried by said needle and cooperating with said control tube to regulate the exhaust of pressure fluid from one of said chambers, and means adjustable to regulate the range of the sliding movement of said tube with respect to said needle, whereby adjustment of said adjustable means when the control tube is held stationary results in movement of said needle.

PHILLIP A. KENZIE.